(12) United States Patent
Takehara et al.

(10) Patent No.: US 11,048,241 B2
(45) Date of Patent: *Jun. 29, 2021

(54) PRODUCTION SCHEDULE CREATING METHOD AND PRODUCTION SCHEDULE CREATING APPARATUS

(71) Applicant: Panasonic Intellectual Property Management Co., Ltd., Osaka (JP)

(72) Inventors: Hirokazu Takehara, Fukuoka (JP); Hiroki Sagara, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 142 days.

This patent is subject to a terminal disclaimer.

(21) Appl. No.: 16/351,845

(22) Filed: Mar. 13, 2019

(65) Prior Publication Data
US 2019/0302746 A1 Oct. 3, 2019

(30) Foreign Application Priority Data
Mar. 30, 2018 (JP) .............................. JP2018-067337

(51) Int. Cl.
G05B 19/418 (2006.01)
(52) U.S. Cl.
CPC .............. *G05B 19/41865* (2013.01); *G05B 2219/34418* (2013.01); *G05B 2219/45026* (2013.01)
(58) Field of Classification Search
USPC ...................................................... 700/100
See application file for complete search history.

(56) References Cited

U.S. PATENT DOCUMENTS

| 6,795,742 B1* | 9/2004 | Ichikawa | G06Q 10/06 700/97 |
| 2003/0105543 A1* | 6/2003 | Muramatsu | G05B 19/41865 700/103 |
| 2006/0212323 A1* | 9/2006 | Ninomiya | G06Q 10/06312 705/7.22 |

(Continued)

FOREIGN PATENT DOCUMENTS

JP 2015-176239 10/2015

*Primary Examiner* — Md Azad
(74) *Attorney, Agent, or Firm* — Pearne & Gordon LLP

(57) ABSTRACT

A production schedule creating method includes: acquiring production sequence information including a production sequence for producing a plurality of models of products and preparation work sequence information including a sequence of arrangement work of arranging members corresponding to the plurality of models on arrangement means which is attached to production equipment so as to arrange the members that are used for production of the products; acquiring arrangement means information including production arrangement means information that is information of the arrangement means attached to the production equipment and equipment detached arrangement means information that is information of an equipment detached arrangement means that is not attached to the production equipment; optimizing a production schedule obtained after a time point of acquisition of the arrangement means information, based on the production sequence information, the preparation work sequence information, and the arrangement means information.

14 Claims, 9 Drawing Sheets

(56) References Cited

U.S. PATENT DOCUMENTS

2015/0261216 A1    9/2015    Yasuma et al.
2019/0049935 A1*  2/2019    Ikeda ............... G05B 19/41805
2019/0228360 A1*  7/2019    Aoyama ................ G06Q 50/04

* cited by examiner

| SET-UP NUMBER | NUMBER OF USING CARRIAGES | DETACHMENT WORK TIME | ATTACHMENT WORK TIME |
|---|---|---|---|
| a7012 | 9 | 0:40 | 1:19 |
| a7013 | 9 | 0:47 | 1:34 |
| a7014 | 9 | 0:40 | 1:20 |
| a7016 | 9 | 1:44 | 3:28 |
| a7021 | 9 | 0:28 | 0:56 |
| a7022 | 9 | 1:22 | 2:44 |
| a7025 | 9 | 0:46 | 1:33 |
| a7030 | 9 | 1:46 | 3:32 |
| a7031 | 9 | 0:51 | 1:42 |
| a7032 | 9 | 1:10 | 2:22 |
| a7038 | 9 | 0:47 | 1:40 |
| a7039 | 9 | 1:35 | 3:10 |

| SET-UP NUMBER | NUMBER OF USING CARRIAGES | CARRIAGE LOCATION |
|---|---|---|
| a7022 | 9 | L1 |
| a7025 | 9 | L2 |
| a7030 | 9 | L3 |
| a7031 | 9 | PREPARATION AREA |
| a7032 | 9 | PREPARATION AREA |

↑ 41  ↑ 42  ↑ 45

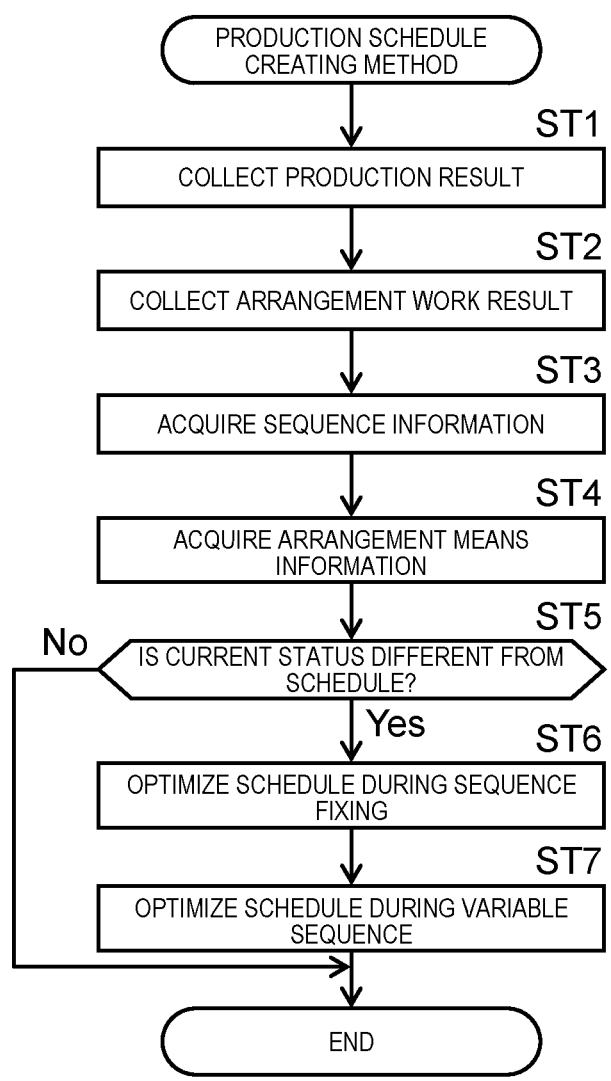

PRODUCTION SCHEDULE CREATING METHOD AND PRODUCTION SCHEDULE CREATING APPARATUS

BACKGROUND

1. Technical Field

The present disclosure relates to a production schedule creating method and a production schedule creating apparatus for creating a production schedule for producing a plurality of models of products by production equipment.

2. Description of the Related Art

A plurality of models of products are produced on a production line for producing a product such as a mounting board on which an electronic component is mounted. When a model of a product to be produced is changed, set-up changing of changing a member that is used for producing a product in the production line is performed. The set-up changing includes an external set-up that is performed in a preparation area other than a production area in parallel with the production of the product. When a production schedule for producing a plurality of models of products is created, a schedule in which a product can be produced within a delivery date is created, also with consideration for a preparation schedule of set-up changing or the like (for example, Japanese Patent Unexamined Publication No. 2015-176239).

Japanese Patent Unexamined Publication No. 2015-176239 discloses a work schedule creating system that picks out interrupted work that remains incomplete, not-yet-commenced delayed work that is delayed from a schedule, and not-yet-commenced work to be commenced in the further in a schedule, prioritizes the interrupted work, the delayed work, and the not-yet-commenced work in this order, creates a work schedule for the next day.

SUMMARY

According to the present disclosure, there is provided a production schedule creating method used in a production schedule creating apparatus that creates a production schedule for producing a plurality of models of products by production equipment, the method including: a sequence information acquiring step of acquiring production sequence information including a production sequence for producing the plurality of models of products and preparation work sequence information including a sequence of arrangement work of arranging members corresponding to the plurality of models on arrangement means which is attached to the production equipment so as to arrange the members that are used for production of the products; an arrangement means information acquiring step of acquiring arrangement means information including production arrangement means information that is information of the arrangement means attached to the production equipment and equipment detached arrangement means information that is information of an equipment detached arrangement means that is not attached to the production equipment; and a schedule optimizing step of optimizing a production schedule obtained after a time point of acquisition of the arrangement means information, based on the production sequence information, the preparation work sequence information, and the arrangement means information.

According to the present disclosure, there is provided a production schedule creating apparatus that creates a production schedule for producing a plurality of models of products by production equipment, the apparatus including: a sequence information acquirer that acquires production sequence information including a production sequence for producing the plurality of models of products and preparation work sequence information including a sequence of arrangement work of arranging members corresponding to the plurality of models on arrangement means which is attached to the production equipment so as to arrange the members that are used for production of the products; an arrangement means information acquirer that acquires arrangement means information including production arrangement means information that is information of the arrangement means attached to the production equipment and equipment detached arrangement means information that is information of an equipment detached arrangement means that is not attached to the production equipment; and a schedule optimizing processor that optimizes a production schedule obtained after a time point of acquisition of the arrangement means information, based on the production sequence information, the preparation work sequence information, and the arrangement means information.

In the present disclosure, it is possible to reflect a situation of a production site so as to create a production schedule with high accuracy.

BRIEF DESCRIPTION OF THE DRAWINGS

FIG. 6 is a diagram of an example of set-up group information that is used in the managing computer (production schedule creating apparatus) of the exemplary embodiment of the present disclosure;

FIG. 7 is a diagram of an example of carriage use situation information that is used in the managing computer (production schedule creating apparatus) of the exemplary embodiment of the present disclosure;

FIG. 10 is a flowchart of a production schedule creating method in the managing computer (production schedule creating apparatus) of the exemplary embodiment of the present disclosure.

DETAILED DESCRIPTION

Although future production progress changes depending also on a preparation situation such as a current external set-up, in a work schedule creating system disclosed in Japanese Patent Unexamined Publication No. 2015-176239, there is a problem in that a work schedule in the future is created based only on a progress situation of work with respect to a product to be produced, and thus there is room for further improvement in order to create the production schedule with high accuracy.

In this respect, an object of the present disclosure is to provide a production schedule creating method and a production schedule creating apparatus that can reflect a situation of a production site so as to create a production schedule with high accuracy.

Figure 3:
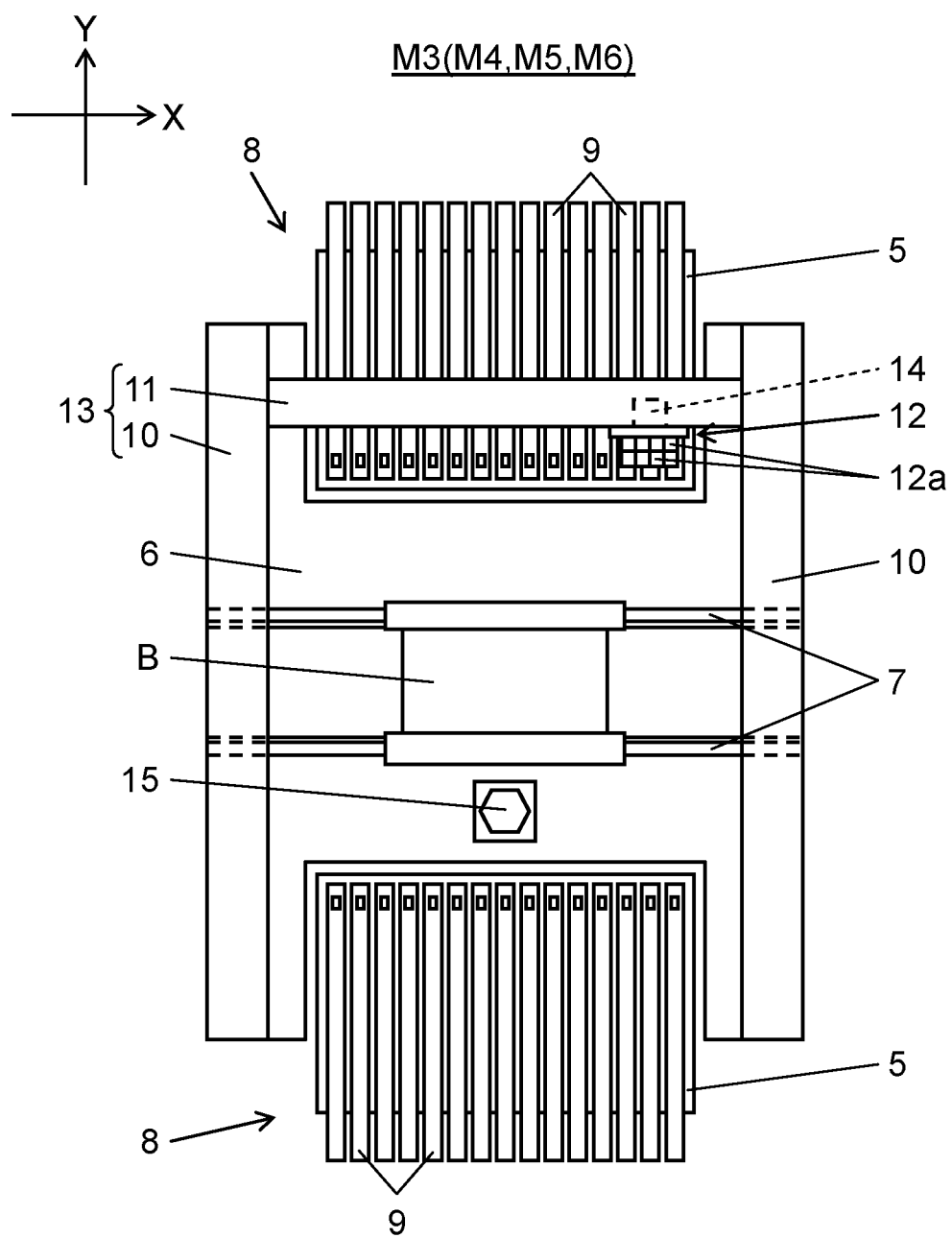
FIG. 3 is a plan view of a component mounter included in the component mounting system of the exemplary embodiment of the present disclosure.
Figure 4:
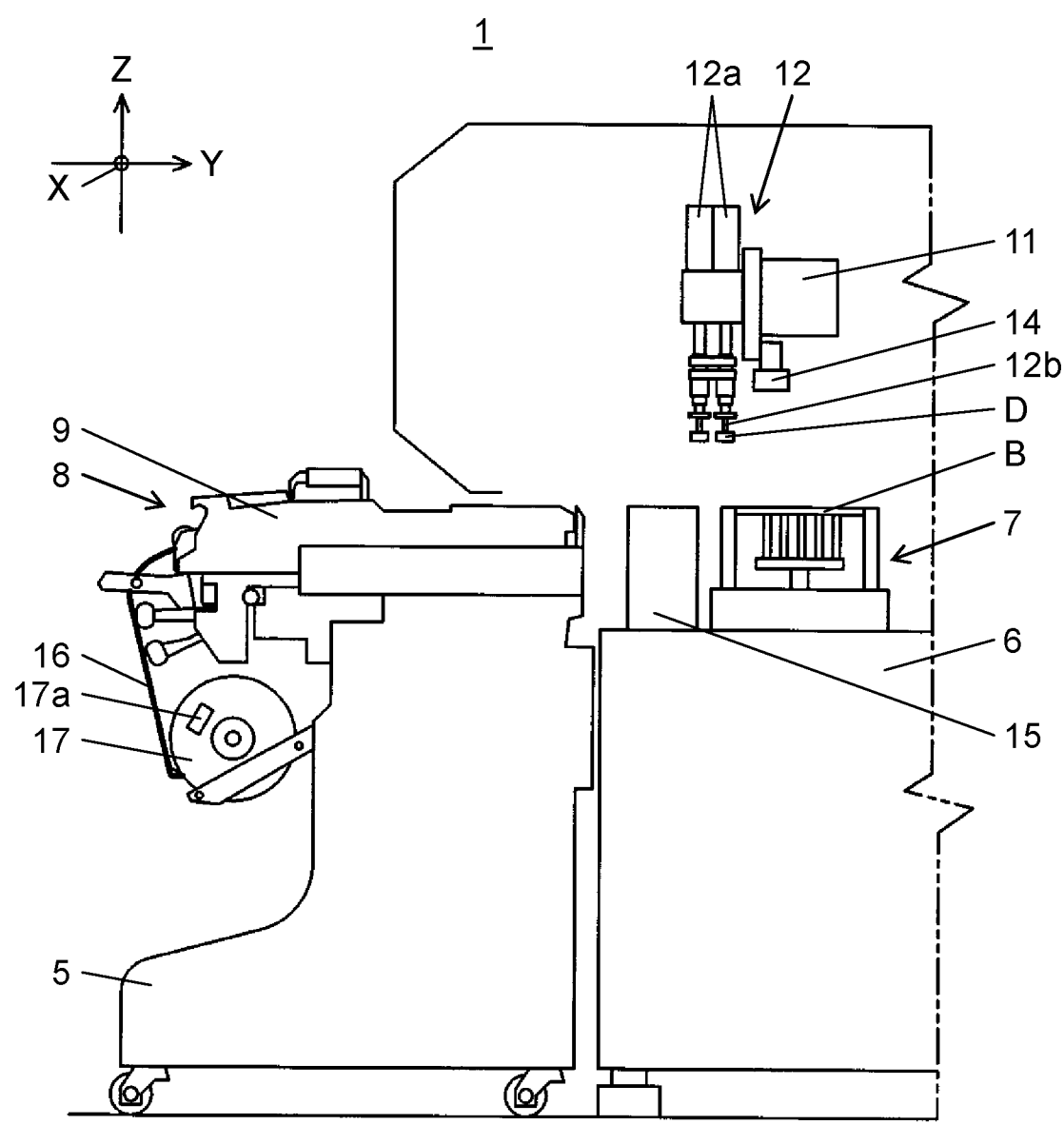
FIG. 4 is a partial sectional view of the component mounter included in the component mounting system of the exemplary embodiment of the present disclosure.

Hereinafter, exemplary embodiments of the present disclosure will be described in detail with reference to the drawings. A configuration, a shape, or the like to be described below, is an example for providing the description and can be appropriately modified according to specifications of a component mounting system, a component mounting line, a component mounter, and a carriage. Hereinafter, the same reference signs are assigned to corresponding elements in all of the drawings, and thus repeated description thereof is omitted. In FIG. 3 and a part of the following description, an X direction (right-left direction in FIG. 3) of a board transporting direction and a Y direction (vertical direction in FIG. 3) orthogonal to the board transporting direction are illustrated as two axial directions which are orthogonal to each other in a horizontal plane. In FIG. 4, a Z direction (vertical direction in FIG. 4) is illustrated as a height direction orthogonal to the horizontal plane. The Z direction is the vertical direction or an orthogonal direction in a case where the component mounter is installed on a horizontal plane.

First, a configuration of component mounting system 1 is described with reference to FIG. 1. Component mounting system 1 has a configuration in which three component mounting lines L1 to L3 arranged on floor F are connected to each other via communication network 2 and managing computer 3 manages the three component mounting lines. Component mounting lines L1 to L3 are arranged in production area Ap provided on floor F. Component mounting lines L1 to L3 are configured of a plurality of connected pieces of production equipment including the component mounter as will be described below and have a function of producing a mounting board having a configuration in which an electronic component is mounted on a board. There is no need to provide three component mounting lines L1 to L3 in component mounting system 1, and two and four or more component mounting lines may be provided.

Arrangement work supporting device 4 is disposed in preparation area As different from production area Ap provided on floor F. Arrangement work supporting device 4 is connected to managing computer 3 via communication network 2. Carriage 5 for replacement, which is a target of arrangement work to be described below, is connected to arrangement work supporting device 4. A plurality of carriages 5 having various statuses such as before, while, or after the arrangement work is performed are stored in preparation area As.

Figure 1:
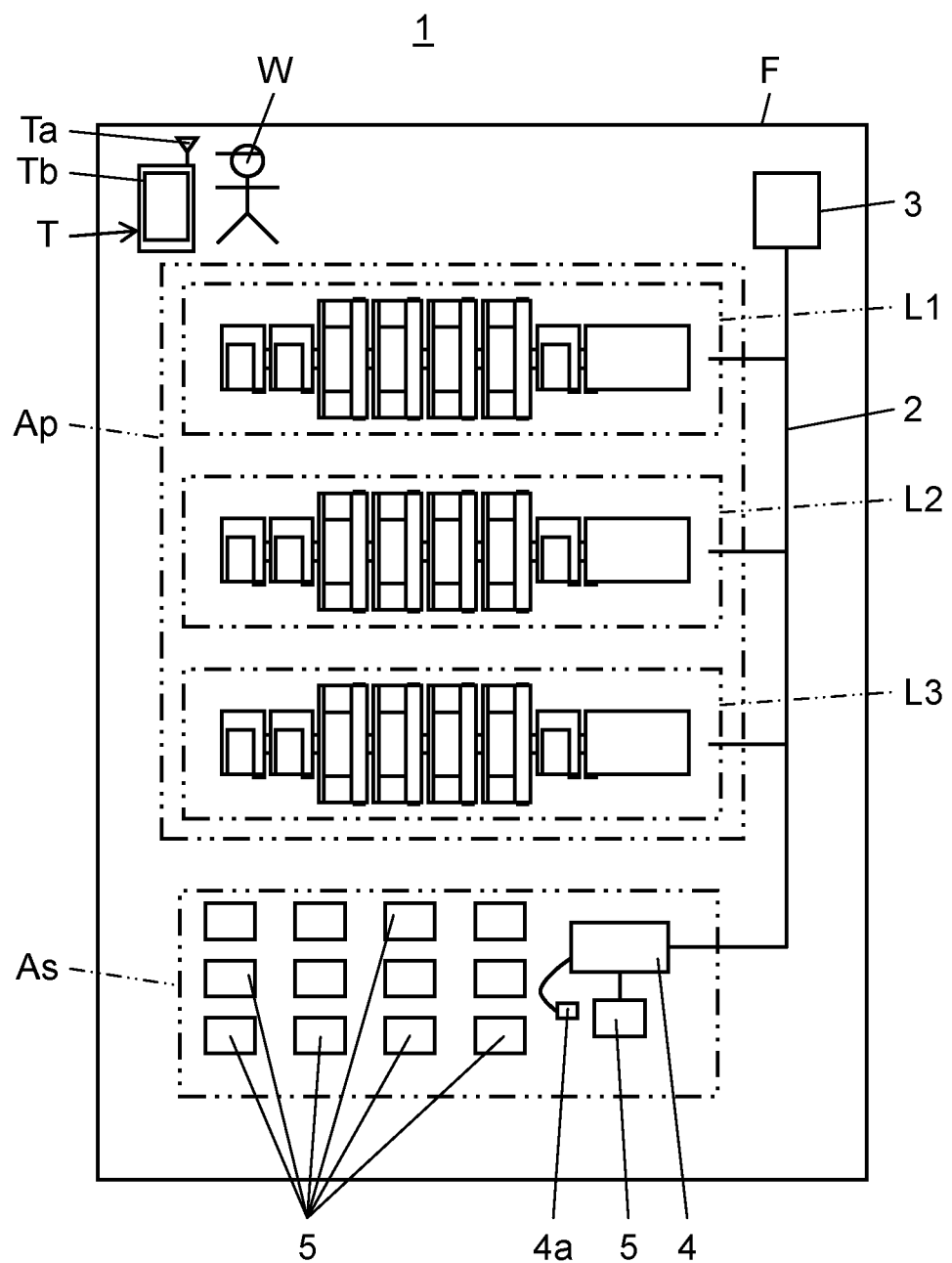
FIG. 1 is a diagram for illustrating a configuration of a component mounting system of an exemplary embodiment of the present disclosure.

In FIG. 1, on carriage 5 connected to arrangement work supporting device 4, a worker performs the arrangement work of installing a plurality of tape feeders 9 (refer to FIG. 3) or the like, which supply an electronic component, on carriage 5, in accordance with a work instruction corresponding to a model of mounting board that is produced on component mounting lines L1 to L3 from the carriage. When tape feeder 9 is installed on carriage 5 connected to arrangement work supporting device 4, electric power is supplied to tape feeder 9 by arrangement work supporting device 4 via carriage 5 such that a feeder controller (not illustrated) that is internally provided in tape feeder 9 comes into a state of being capable of communicating with managing computer 3.

The worker includes a working device that performs the arrangement work of installing the plurality of tape feeders 9 or the like, which supply an electronic component, on carriage 5, in accordance with the work instruction corresponding to the model of mounting board to be produced, in addition to a person who performs work. The working device may be configured to complete the arrangement work inside the device or include an articulated robot that performs the arrangement work in a procedure close to a work procedure performed by a person outside the device. In addition, the number of workers may include only one or both the persons and the working devices.

Consequently, in managing computer 3, it is possible to acquire a state of arrangement work such as an installation state of tape feeder 9 to carriage 5 or a supply state of carrier tape 16 (refer to FIG. 4), in which the electronic component to be installed in tape feeder 9 is held, to tape feeder 9. In the arrangement work, carrier tape 16 is attached to tape feeder 9. Code reader 4a included in arrangement work supporting device 4 performs work of reading and checking information of barcode 17a (refer to FIG. 4) or the like on reel 17 that is housed in a state in which carrier tape 16 is wound. There is no need to provide one arrangement work supporting device 4 that is disposed in preparation area As, and two or more arrangement work supporting devices may be provided.

In FIG. 1, worker W who carries portable terminal T performs various types of work within floor F. Portable terminal T includes terminal-side communicator Ta that performs wireless communication with managing computer 3 so as to transmit and receive information to and from the managing computer and touch panel Tb having a display function and an input function. Portable terminal T performs display processing on various items of information received form managing computer 3 and displays the processed information on touch panel Tb. In addition, portable terminal T transmits various items of information input from touch panel Tb to managing computer 3.

As described above, on carriages 5 in preparation area As, which include carriage 5 connected to arrangement work supporting device 4, it is possible to perform the arrangement work in parallel with the production of the mounting board in component mounting lines L1 to L3. When a model of mounting board to be produced in component mounting lines L1 to L3 is changed, the worker moves carriage 5, on which tape feeder 9 is installed in preparation area As, to component mounting lines L1 to L3 and performs replacement work of replacing carriage 5 installed in the component mounter.

Figure 2:
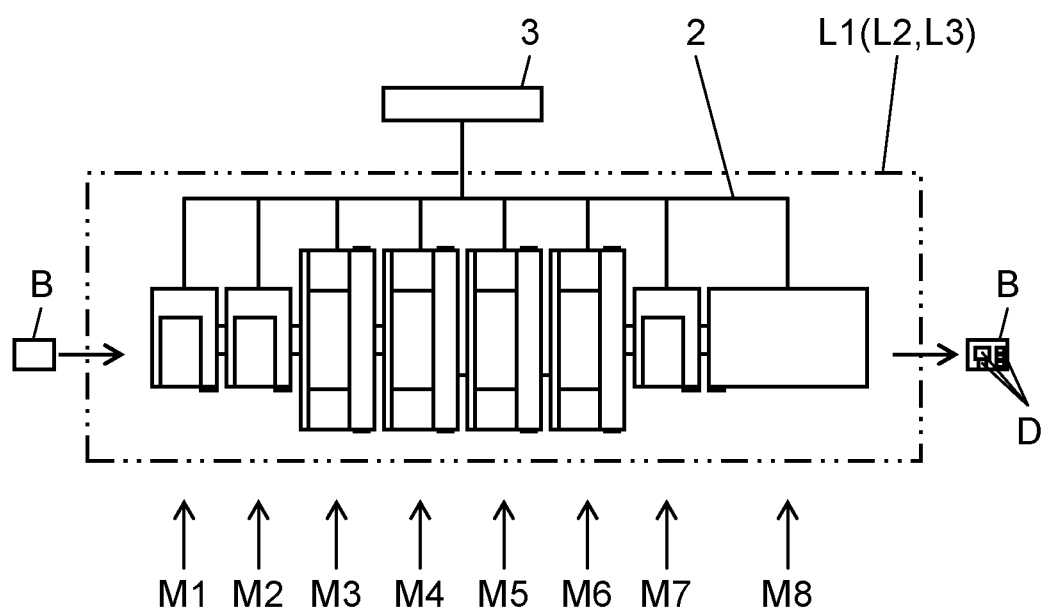
FIG. 2 is a diagram for illustrating a configuration of a component mounting line included in the component mounting system of the exemplary embodiment of the present disclosure.

Next, a detailed configuration of component mounting lines L1 to L3 will be described with reference to FIG. 2. Component mounting lines L1 to L3 have the same configuration as each other and, hereinafter, component mounting line L1 will be described. Component mounting line L1 has a configuration in which production equipment such as solder printing device M1, print inspecting device M2, component mounters M3 to M6, mounting inspecting device M7, and reflow device M8, are connected to each other in series from an upstream side (left side on the paper surface)

to a downstream side (right side on the paper surface) in a board transporting direction. Component mounting line L1 is a production equipment group that is connected via communication network 2, and the pieces of production equipment may not be physically connected to each other.

Solder printing device M1, print inspecting device M2, component mounters M3 to M6, mounting inspecting device M7, and reflow device M8 are connected to managing computer 3 via communication network 2. Solder printing device M1 performs a solder printing job in which printing is performed with solder by a solder printing-job operator via a mask onto board B brought in from the upstream side. Print inspecting device M2 performs print inspecting work of inspecting a state of solder printed on board B by print inspecting work operator including a solder inspecting camera. A solder applicator that applies the solder on board B may be provided along with solder printing device M1 or in addition to solder printing device M1. In addition, component mounting line L1 may not include print inspecting device M2.

Component mounters M3 to M6 perform component mounting work of mounting electronic component D on board B by a component mounting work operator. Component mounting line L1 is not limited to a configuration in which four component mounters M3 to M6 are provided, and one to three or five or more component mounters M3 to M6 may be provided. Mounting inspecting device M7 performs mounting inspecting work of inspecting a state of electronic component D mounted on board B by mounting inspecting work operator including a component inspecting camera. Reflow device M8 heats board B brought in the device by a board heater, causes the solder on board B to harden, and performs board heating work of bonding an electrode portion of board B to electronic component D. Component mounting line L1 may not include mounting inspecting device M7.

Next, a configuration of component mounters M3 to M6 will be described with reference to FIGS. 3 and 4. Component mounters M3 to M6 have the same configuration as each other and, here, component mounter M3 will be described. Component mounter M3 has a function of mounting electronic component D on board B. In FIG. 3, board transport mechanism 7 is disposed in an X direction at the center of base stand 6. Board transport mechanism 7 transports board B brought in from the upstream side in the X direction and positions and holds the board at a mounting working position by a mounting head to be described below. In addition, board transport mechanism 7 brings out board B, on which the component mounting work is ended, to the downstream side. Component suppliers 8 are disposed on both sides of board transport mechanism 7.

Carriage 5, on which the plurality of tape feeders 9 are installed side by side in the X direction, is attached to each of component supplier 8. Tape feeder 9 performs pitch feeding of the carrier tape provided with a pocket for housing electronic component D in a direction (tape feeding direction) from outside of component supplier 8 toward board transport mechanism 7, thereby supplying electronic component D to a component picking-up position at which the mounting head picks up electronic component D.

In FIG. 3, Y-axis tables 10 including a linear drive mechanism are disposed at both end portions of a top surface of base stand 6 in the X direction. On Y-axis table 10, beam 11 including a linear mechanism, which is similar to Y-axis table 10, is bonded to Y-axis table 10 so as to move freely in the Y direction. Mounting head 12 is installed on the beam 11 so as to move freely in the X-axis direction. Mounting head 12 has a plurality of (here, eight) nozzle units 12a. In FIG. 4, each of nozzle units 12a has a lower end portion provided with suction nozzle 12b that performs vacuum suction of electronic component D so as to hold the electronic component.

In FIG. 3, mounting head moving mechanism 13 is configured to include Y-axis table 10 and beam 11 and moves mounting head 12 in a horizontal direction (X direction and Y direction). Mounting head moving mechanism 13 and mounting head 12 perform the component mounting work in which suction nozzle 12b suctions and picks up electronic component D from the component picking-up position of tape feeder 9 installed in component supplier 8 and conveys and mounts the electronic component at a mounting position of board B held by board transport mechanism 7.

In FIGS. 3 and 4, head camera 14 that is positioned on an undersurface side of beam 11 so as to integrally move along with mounting head 12 is installed on beam 11. Mounting head 12 moves, and thereby head camera 14 moves above board B positioned at the mounting working position of board transport mechanism 7 so as to image a board mark (not illustrated) provided on board B. In this manner, a position of board B is recognized.

Component recognition camera 15 is disposed between component supplier 8 and board transport mechanism 7. When mounting head 12 that has taken out electronic component D from component supplier 8 moves above the component recognition camera, component recognition camera 15 images electronic component D held by suction nozzle 12b so as to recognize a holding position or the like. In the component mounting work of electronic component D to board B by mounting head 12, the mounting position is corrected with consideration for a recognition result of board B by head camera 14 and a recognition result of electronic component D by component recognition camera 15.

In FIG. 4, reel 17, around which carrier tape 16 housing electronic component D is wound, is held on a front side of carriage 5. Tape feeder 9 transports carrier tape 16, which is housed in reel 17, in a tape feeding direction, so as to supply electronic component D to a component picking-up position by mounting head 12.

As described above, component mounters M3 to M6 are the production equipment that produces mounting board on which electronic component D as a product is mounted, and component mounting lines L1 to L3 including component mounters M3 to M6 are production lines that produce the mounting board. Carriage 5 is arrangement means on which members (tape feeder 9 and reel 17) which are used in the production of the product (mounting board) are arranged. Carriage 5 is attached to component mounters M3 to M6 configuring component mounting lines L1 to L3 such that the members are arranged.

Next, a configuration of managing computer 3 will be described with reference to FIG. 5. Managing computer 3 includes inputter 30, display 31, wireless communicator 32, and communicator 33, in addition to processor 20, production schedule storage 27, preparation work schedule storage 28, and worker information storage 29 which are storage devices. Processor 20 is a data processing device such as a CPU and includes production result collector 21, arrangement work result collector 22, sequence information acquirer 23, arrangement means information acquirer 24, schedule optimizing processor 25, and work instruction processor 26 as internal processors. Managing computer 3 does not need to be configured of one computer and may be configured of a plurality of devices. For example, the entire or a part of storage device may include a cloud via a server.

Inputter 30 is an input device such as a keyboard, a touch panel, or a mouse and is used in an operating command, during data input, or the like. Display 31 is a display device such as a liquid crystal panel and displays various types of information such as an operating screen for an operation by inputter 30, as well as displaying various items of data stored in the storages. Wireless communicator 32 performs wireless communication with portable terminal T so as to transmit and receive information. Communicator 33 is a communication interface and transmits and receives a signal or data to and from production equipment such as component mounters M3 to M8 including component mounting lines L1 to L3 or arrangement work supporting device 4 via communication network 2.

Figure 5:
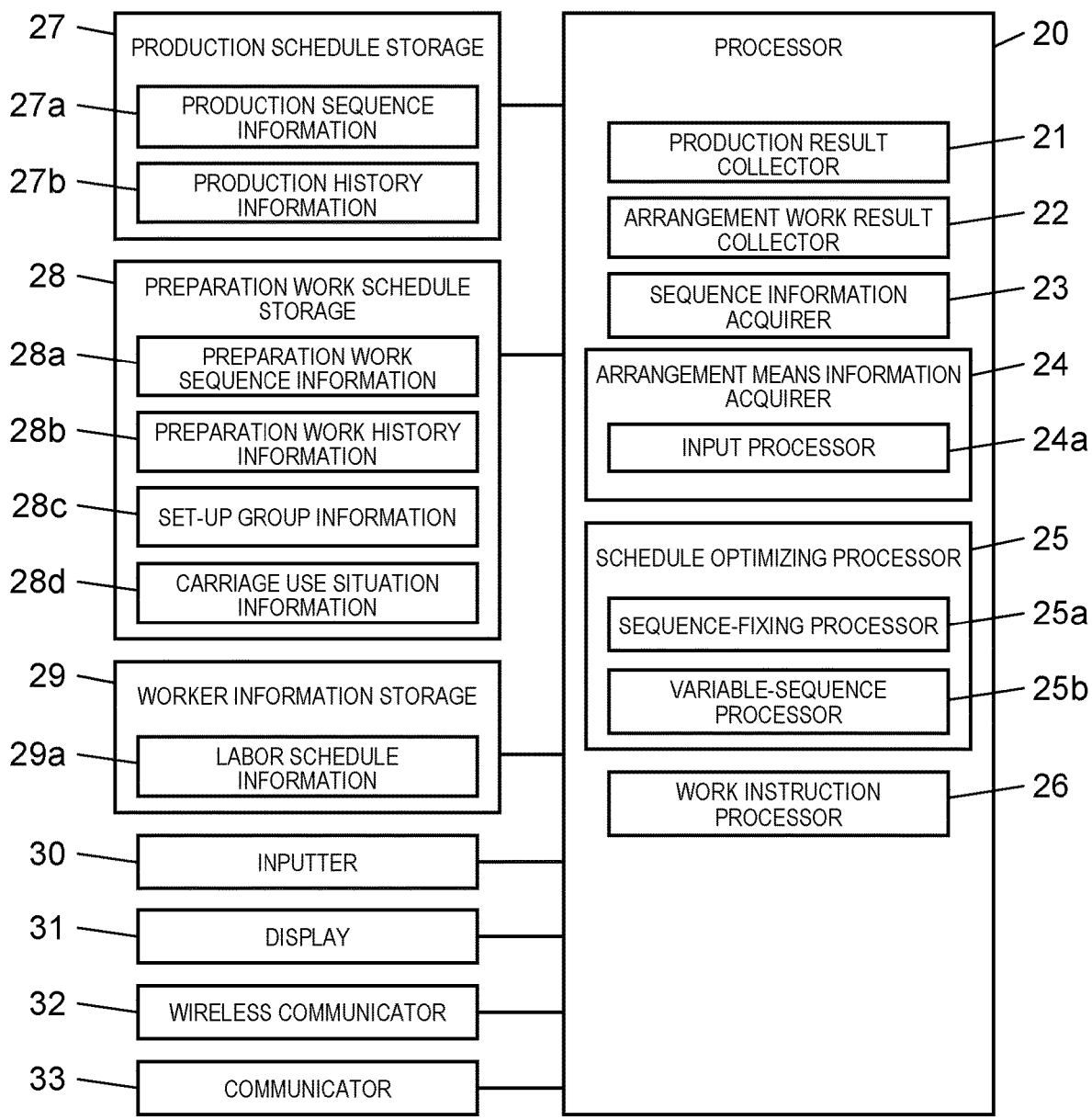
FIG. 5 is a block diagram illustrating a configuration of a managing computer (production schedule creating apparatus) of the exemplary embodiment of the present disclosure.

In FIG. 5, production schedule storage 27 stores production sequence information 27a, production history information 27b, or the like. In production sequence information 27a, a production schedule such as a line number for identifying component mounting lines L1 to L3 that produce a mounting board, a start time point and an end time point of production, a time point of replacement work of carriage 5 in component mounting lines L1 to L3, a production sequence, or the number of production of the mounting boards is stored for each lot number for identifying a lot of the mounting board to be produced. In other words, production sequence information 27a includes a production sequence for producing a plurality of models of products (mounting boards). Production result collector 21 collects, as needed, a production result such as the lot number or the number of production of the mounting boards (products) that are produced by the production equipment of component mounting lines L1 to L3 and causes production schedule storage 27 to store the production result as production history information 27b.

In FIG. 5, preparation work schedule storage 28 stores preparation work sequence information 28a, preparation work history information 28b, set-up group information 28c, carriage use situation information 28d, or the like. In preparation work sequence information 28a, the start time point and the end time point of the arrangement work of arranging members (tape feeder 9 and reel 17) corresponding to a model on carriage 5 (arrangement means), an arrangement work commenceable time point when the arrangement work is commenceable, or a preparation work schedule such as a sequence of the arrangement work is stored for each model number for identifying a model of mounting board. In other words, preparation work sequence information 28a includes a sequence of the arrangement work of arranging the members corresponding to the models on the arrangement means which is attached to the production equipment (component mounters M3 to M6) so as to arrange the members that are used for production of the product (mounting board).

Arrangement work result collector 22 collects, as needed, an arrangement work result such as information of the model (set-up number) of the mounting board on which the arrangement work is performed in arrangement work supporting device 4 or the members (tape feeder 9 and reel 17) arranged on carriage 5 and causes preparation work schedule storage 28 to store the arrangement work result as preparation work history information 28b.

In set-up group information 28c, a set-up number or the like for identifying a set-up group for arranging the members corresponding to the model of the mounting board on the plurality of carriages 5 which are simultaneously attached to component mounting lines L1 to L3 and used to produce the mounting boards is stored. The set-up number of set-up group information 28c is associated with the lot number of production sequence information 27a. Consequently, it is possible to identify the set-up group of carriages 5 that are attached to component mounting lines L1 to L3. In addition, the set-up number of set-up group information 28c is associated with the model number of preparation work sequence information 28a. Consequently, it is possible to identify the set-up group of carriages 5 in preparation area As.

Here, an example of set-up group information 28c is described with reference to FIG. 6. Set-up group information 28c includes set-up number 41, number-of-used-carriages 42, detachment working time 43, and attachment working time 44. Set-up number 41 is information for identifying the set-up group. Number-of-used-carriages 42 is the number of carriages 5 that are used in the set-up group. Detachment working time 43 is a total working time taken to detach the members from carriage 5 as the arrangement work. Attachment working time 44 is a total working time taken to attach the members corresponding to the model of the set-up group to carriage 5 as the arrangement work.

In FIG. 5, worker information storage 29 stores labor schedule information 29a or the like. Labor schedule information 29a includes the number of workers, who work on floor F, or the like for each production time point. Sequence information acquirer 23 acquires production sequence information 27a from production schedule storage 27 and acquires preparation work sequence information 28a from preparation work schedule storage 28.

Arrangement means information acquirer 24 acquires production arrangement means information including set-up number 41 of carriages 5 that are attached to component mounting lines L1 to L3 based on production history information 27b and set-up group information 28c. In addition, arrangement means information acquirer 24 acquires equipment detached arrangement means information including set-up number 41 of carriages 5 that are not attached to component mounting lines L1 to L3 in preparation area As or the like on floor F, based on preparation work history information 28b and set-up group information 28c. Carriage 5 that is not attached to component mounting lines L1 to L3 is an example of an equipment detached arrangement means.

Arrangement means information acquirer 24 causes preparation work schedule storage 28 to store the acquired production arrangement means information and the equipment detached arrangement means information as carriage use situation information 28d. In addition, arrangement means information acquirer 24 calculates the number of empty carriages 5 (carriages 5 to which set-up number 41 is not assigned) on which members are not arranged, of carriages 5 of which information is included in the equipment detached arrangement means information, based on the total number of carriages 5 on floor F.

As described above, arrangement means information acquirer 24 acquires arrangement means information including the production arrangement means information that is information of the arrangement means (carriages 5) attached to the production equipment (component mounters M3 to M6) including component mounting lines L1 to L3 and the equipment detached arrangement means information that is information of the equipment detached arrangement means that is not attached to the production equipment, based on production history information 27b, preparation work history information 28b, set-up group information 28c, and the total number of carriages 5 on floor F. In addition, the equipment detached arrangement means information may include information about whether or not the members are arranged on the equipment detached arrangement means.

Here, an example of carriage use situation information 28d is described with reference to FIG. 7. Carriage use situation information 28d includes set-up number 41, number-of-used-carriages 42, and carriage location 45. Set-up number 41 and number-of-used-carriages 42 are the same as those in set-up group information 28c illustrated in FIG. 6. Carriage location 45 is information for identifying a location of carriage 5 of the set-up group. For example, "L1", "L2", and "L3" indicate that carriages 5 are located in component mounting line L1, component mounting line L2, and component mounting line L3, respectively. The "preparation area" indicates that carriage 5 is located in preparation area As.

In FIG. 5, arrangement means information acquirer 24 includes input processor 24a as an internal processor. Input processor 24a displays a site situation input screen for changing or adding the production arrangement means information and the equipment detached arrangement means information depending on a situation of the site, on portable terminal T carried by worker W. In addition, input processor 24a acquires information input to portable terminal T by worker W so as to update carriage use situation information 28d. In other words, input processor 24a of arrangement means information acquirer 24 acquires the arrangement means information input by worker W.

Here, an example of site situation input screen 50 displayed on touch panel Tb of portable terminal T carried by worker W is described with reference to FIG. 8. In a case where worker W carries portable terminal T, visits floor F, and finds that there is a change in situation of carriage 5 displayed on site situation input screen 50 or there is carriage 5 that is not displayed, the worker performs a process of changing or adding as will be described below.

Figure 8:
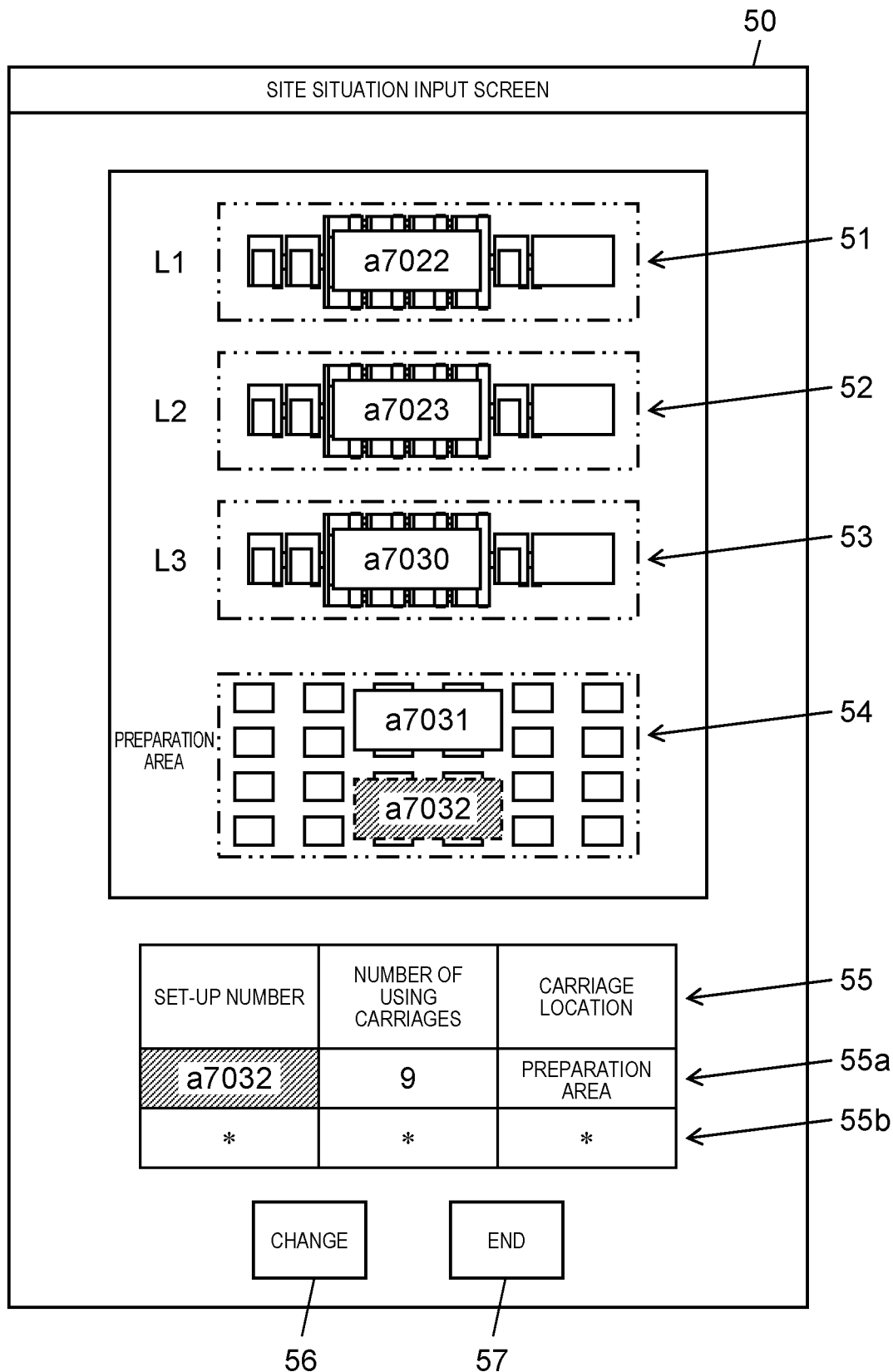
FIG. 8 is a diagram of an example of a site situation input screen displayed on a touch panel of a portable terminal that communicates with the managing computer (production schedule creating apparatus) of the exemplary embodiment of the present disclosure.

In FIG. 8, on site situation input screen 50, "component mounting line L1" display region 51, "component mounting line L2" display region 52, "component mounting line L3" display region 53, "preparation area" display region 54, "arrangement means information" input region 55, "change" button 56, and "end" button 57 are displayed. In "component mounting line L1" display region 51, "component mounting line L2" display region 52, and "component mounting line L3" display region 53, set-up numbers 41 of carriages 5 attached to component mounting lines L1 to L3, which is included in carriage use situation information 28d, are displayed, respectively.

In "preparation area" display region 54, set-up number 41 of carriage 5 present in preparation area As, which is included in carriage use situation information 28d, is displayed. Even in a case where carriage 5 assigned with set-up number 41 is present outside preparation area As, the set-up number is displayed in "preparation area" display region 54. "Arrangement means information" input region 55 includes changing region 55a for changing set-up number 41 displayed on site situation input screen 50 and adding region 55b for adding set-up number 41 displayed thereon.

In FIG. 8, when worker W selects set-up number 41 displayed in display regions 51 to 54 (with a single tap or the like) in a case of changing set-up number 41, set-up number 41 selected in changing region 55a and information such as number-of-used-carriages 42 corresponding to set-up number 41 or carriage location 45 included in carriage use situation information 28d are displayed. In FIG. 8, "a7032" of "preparation area" display region 54 is selected. Further, when worker W selects set-up number 41 displayed in changing region 55a (with double taps or the like), set-up number 41 of a change candidate included in set-up group information 28c is displayed, and set-up number 41 or the like displayed in changing region 55a is changed when worker W selects the change candidate.

In a case of adding set-up number 41, when worker W selects adding region 55b, set-up number 41 of an adding candidate included in set-up group information 28c is displayed. Further, when worker W selects an adding candidate, set-up number 41 or the like to be added in adding region 55b is displayed. In addition, it is possible to change or add number-of-used-carriages 42 or carriage location 45 in changing region 55a and adding region 55b through selection by worker W.

In FIG. 8, when worker W operates "change" button 56 in a state in which information in "arrangement means information" input region 55 is changed or added, information in display regions 51 to 54 on site situation input screen 50 is updated and changed or added information is transmitted to managing computer 3. Input processor 24a updates carriage use situation information 28d based on the transmitted information. When worker W operates "end" button 57, site situation input screen 50 is ended and transitions to a predetermined screen, and a notification indicating such a state is simultaneously transmitted to managing computer 3.

In FIG. 5, schedule optimizing processor 25 optimizes a production schedule obtained after a time point (current time point) when arrangement means information acquirer 24 acquires arrangement means information, based on production sequence information 27a, production history information 27b, preparation work sequence information 28a, carriage use situation information 28d (arrangement means information), and labor schedule information 29a. More specifically, schedule optimizing processor 25 causes sequence fixing processor 25a and variable-sequence processor 25b to efficiently perform the preparation work such as the arrangement work with the number of planned workers and optimizes the production schedule and the preparation work schedule such that the production of the product (mounting board) is ended early (an end time point is advanced).

Figure 9:
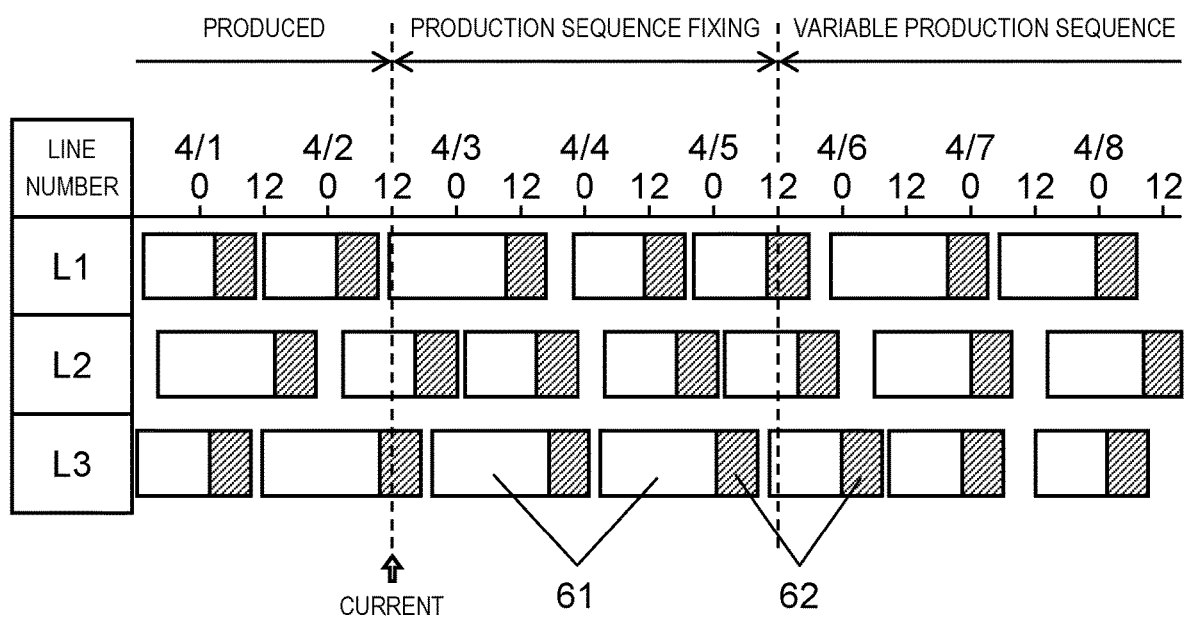
FIG. 9 is a diagram for illustrating a schedule optimizing process in the managing computer (production schedule creating apparatus) of the exemplary embodiment of the present disclosure.

Here, an example of the production schedule for producing the mounting boards in component mounting lines L1 to L3 is described with reference to FIG. 9. In FIG. 9, results from a current time point (12 o'clock, April 2) to two days before (12 o'clock, March 31) and a schedule from the current time point to six days later (12 o'clock, April 8) are included, and production time 61 taken to produce the mounting board and replacement time 62 taken to perform the replacement work of carriage 5 are displayed for each lot.

Sequence fixing processor 25a (schedule optimizing processor 25) optimizes the production schedule and the preparation work schedule obtained after the time point of acquisition of the arrangement means information, in a condition that the production sequence is not changed for a predetermined period (in the example in FIG. 9, three days represented by "production sequence fixing") from a time point (current time point) of the acquisition of the arrangement means information. In this case, sequence fixing processor 25a optimizes the production schedule and the preparation work schedule obtained after the time point of the acquisition of the arrangement means information, based on a production result acquired at the time point of the acquisition of the arrangement means information included in production history information 27b. Consequently, it is possible to optimize the production schedule and the preparation work schedule for a relatively short period with high accuracy, depending on a current situation of carriage 5 and production situations of component mounting lines L1 to L3.

Variable-sequence processor 25*b* (schedule optimizing processor 25) optimizes the production schedule and the preparation work schedule obtained after the predetermined period (in the example in FIG. 9, after 12 o'clock, April 5 represented by "variable production sequence") in a condition in which a change in production sequence is allowed, with a preparation situation of carriage 5 and the production situation of component mounting lines L1 to L3 after the predetermined period (in the example in FIG. 9, 12 o'clock, April 5), in which sequence fixing processor 25*a* performs optimization, as initial states. Variable-sequence processor 25*b* optimizes the production schedule and the preparation work schedule in a condition in which the sequence of the lots is not changed, in a case where the start time point of the arrangement work is more advanced than the arrangement work commenceable time point. The change in production sequence is allowed, and thereby it is possible to plan the production schedule and the preparation work schedule, in which the production of the product (mounting board) is ended earlier, with high accuracy.

Schedule optimizing processor 25 (sequence fixing processor 25*a* and variable-sequence processor 25*b*) optimizes the production schedule and the preparation work schedule obtained after the time point of acquisition of the arrangement means information, in a condition that the production sequence is not changed for the predetermined period from the time point of the acquisition of the arrangement means information and the change in production sequence is allowed after the predetermined period. The predetermined period is not limited to the three days and can be appropriately changed. In addition, schedule optimizing processor 25 does not optimize the production schedule in a case where the current situation of carriage 5 and the production situations of component mounting lines L1 to L3 are not different from the production schedule included in production sequence information 27*a* and the preparation work schedule included in preparation work sequence information 28*a*. Schedule optimizing processor 25 updates production sequence information 27*a* and preparation work sequence information 28*a* based on the optimized production sequence and the optimized sequence of arrangement work.

In FIG. 5, work instruction processor 26 generates an instruction of the arrangement work for the production of the mounting board (product) based on production sequence information 27*a* and preparation work sequence information 28*a* and transmits the instruction to portable terminal T of worker W or arrangement work supporting device 4. In a case where the production schedule and the preparation work schedule are updated by schedule optimizing processor 25, work instruction processor 26 generates and transmits the instruction of the arrangement work based on the updated production sequence information 27*a* and preparation work sequence information 28*a*.

Next, a production schedule creating method used in managing computer 3 (production schedule creating apparatus) that creates the production schedule for producing the plurality of models of products (mounting boards) by production equipment (component mounters M3 to M6) will be described along a flow in FIG. 10. First, production result collector 21 collects the production result of the product by production equipment (component mounters M3 to M6) of component mounting lines L1 to L3 (ST1: production result collecting step). Subsequently, arrangement work result collector 22 collects the arrangement work result in arrangement work supporting device 4 (ST2: arrangement work result collecting step). The production result collecting step (ST1) and the arrangement work result collecting step (ST2) are performed as needed, and the collected production result and arrangement work result are stored as production history information 27*b* and preparation work history information 28*b*, respectively.

Subsequently, sequence information acquirer 23 acquires production sequence information 27*a* stored in production schedule storage 27 and preparation work sequence information 28*a* stored in preparation work schedule storage 28 (ST3: sequence information acquiring step). Subsequently, arrangement means information acquirer 24 acquires arrangement means information including the production arrangement means information and equipment detached arrangement means information, based on production history information 27*b*, preparation work history information 28*b*, set-up group information 28*c* and the total number of carriages 5 on floor F (ST4: arrangement means information acquiring step). In the arrangement means information acquiring step (ST4), worker W may input the latest situation of carriage 5 on floor F by using site situation input screen 50 (refer to FIG. 8) displayed on portable terminal T. In other words, in the arrangement means information acquiring step (ST4), worker W may input the arrangement means information.

In FIG. 10, subsequently, schedule optimizing processor 25 determines whether or not the production result and the preparation work result (current status) at the time point of acquisition of the arrangement means information is different from the production schedule and the preparation work schedule (ST5: optimization-performing determining step). In a case where the current status is different from the schedule (Yes in ST5), subsequently, sequence fixing processor 25*a* (schedule optimizing processor 25) optimizes the production schedule and the preparation work schedule obtained after the time point of the acquisition of the arrangement means information, in a condition that the production sequence is not changed for the predetermined period from the time point of the acquisition of the arrangement means information, based on production sequence information 27*a*, preparation work sequence information 28*a*, and the arrangement means information (ST6: sequence-fixing processing step).

The case where the current status is not different from the schedule includes not only a case where the current status is completely coincident with the schedule, but also a case where the current status is coincident with the schedule within a range of a predetermined schedule error. For example, it may be determined that the current status is different from the schedule in a case where a difference of one hour (schedule error) or longer occurs between the current status and the schedule, and it may be determined that there is no difference between the current status and the schedule in a case of a difference of shorter than one hour.

Subsequently, variable-sequence processor 25*b* (schedule optimizing processor 25) optimizes the production schedule and the preparation work schedule obtained after the time point of acquisition of the arrangement means information, in a condition that the production sequence is allowed to be changed after the predetermined period (ST7: variable-sequence processing step). In other words, the sequence-fixing processing step (ST6) and the variable-sequence processing step (ST7) are a schedule optimizing step of optimizing the production schedule and the preparation work schedule obtained after the time point of the acquisition of the arrangement means information, based on production sequence information 27a, preparation work sequence information 28a, and the arrangement means information. In the schedule optimizing process, sequence fixing processor 25a may optimize the production schedule and the preparation work schedule obtained after the time point of the acquisition of the arrangement means information, based on a production result acquired at the time point of the acquisition of the arrangement means information. Consequently, it is possible to create the production schedule and the preparation work schedule with high accuracy.

In FIG. 10, in a case where there is no difference between the current status and the schedule (No in ST5), the sequence-fixing processing step (ST6) and the variable-sequence processing step (ST7) (schedule optimizing step) are not performed. As described above, the production schedule and the preparation work schedule are optimized based on the status of carriage 5 on floor F at the time point (current time point) of the acquisition of the arrangement means information, and thereby it is possible to reflect the situation of the production site so as to create the production schedule and the preparation work schedule with high accuracy. When the production schedule and the preparation work schedule are changed, work instruction processor 26 generates the instruction of the arrangement work for the production of the mounting board (product) based on updated production sequence information 27a and preparation work sequence information 28a and transmits the work instruction to portable terminal T of worker W or arrangement work supporting device 4.

As described above, managing computer 3 of the exemplary embodiment is the production schedule creating apparatus that creates the production schedule. Managing computer 3 includes sequence information acquirer 23 acquires production sequence information 27a including the production sequence of the product (mounting board) and preparation work sequence information 28a including the sequence of the arrangement work of arranging the members on the arrangement means (carriage 5) which arranges the members (tape feeder 9 and reel 17). Further, managing computer 3 includes arrangement means information acquirer 24, which acquires the arrangement means information including the production arrangement means information that is the information of the arrangement means attached to the production equipment (component mounters M3 to M6) and equipment detached arrangement means information that is information of the arrangement means that is outside the production equipment, and schedule optimizing processor 25 that optimizes the production schedule obtained after the time point of the acquisition of the arrangement means information, based on the production sequence information, the preparation work sequence information, and the arrangement means information.

Consequently, the production schedule and the preparation work schedule are optimized based on the status of carriage 5 on floor F at the time point (current time point) of the acquisition of the arrangement means information, and thereby it is possible to reflect the situation of the production site so as to create the production schedule and the preparation work schedule with high accuracy.

As described above, the description is provided based on the exemplary embodiments of the present disclosure. Various modification examples can be made from the embodiments by combining the types of products which are produced in the production lines, and thus those skilled in the art understand that the modification examples are also included within the scope of the present disclosure. For example, the production line may be a home appliance production line through which home appliances as products are assembled or may be a food processing line through which a food processing product as a product is manufactured.

In addition, in the exemplary embodiments described above, arrangement means information acquirer 24 acquires the production arrangement means information and the equipment detached arrangement means information based on various items of acquired information. However, the arrangement means information acquirer may acquire the production arrangement means information and the equipment detached arrangement means information based on information that is directly acquired from the arrangement means (carriage 5) by using wireless communication, RFID, or the like. In a case of using the wireless communication, the RFID, or the like, the arrangement means (carriage 5) or tape feeder 9 includes a communicating function, an IC tag, a memory, or the like.

In the present disclosure, the production schedule creating method and the production schedule creating apparatus achieve an effect in that it is possible to reflect the situation of the production site so as to create the production schedule with high accuracy and are used in a field of mounting an electronic component on a board.

What is claimed is:

1. A production schedule creating method used in a production schedule creating apparatus that creates a production schedule for producing a plurality of models of products by production equipment, the method comprising:
   creating a production schedule for producing the plurality of models of products by production equipment;
   inputting updated arrangement means information;
   a sequence information acquiring step of acquiring production sequence information including a production sequence for producing the plurality of models of products and preparation work sequence information including a sequence of arrangement work of arranging members corresponding to the plurality of models on arrangement means which is attached to the production equipment so as to arrange the members that are used for production of the products;
   an arrangement means information acquiring step of acquiring the updated arrangement means information including production arrangement means information that is information of the arrangement means attached to the production equipment and equipment detached arrangement means information that is information of an equipment detached arrangement means that is not attached to the production equipment;
   a schedule optimizing step of optimizing the production schedule obtained after a time point of acquisition of the arrangement means information, based on the production sequence information, the preparation work sequence information, and the updated arrangement means information; and
   generating and transmitting at least one work instruction based on the optimized production schedule to at least one of a worker and an arrangement work supporting device.

2. The production schedule creating method of claim 1, wherein, in the schedule optimizing step, the production schedule obtained after the time point of the acquisition is optimized in a condition that the production sequence is not changed for a predetermined period from the time point of the acquisition of the arrangement means information.

3. The production schedule creating method of claim 1, wherein, in the schedule optimizing step, the production schedule obtained after the time point of the acquisition is optimized in a condition that the production sequence is not allowed to be changed for a predetermined period from the time point of the acquisition of the arrangement means information and the production sequence is allowed to be changed after the predetermined period.

4. The production schedule creating method of claim 1, further comprising:
   a production result collecting step of collecting a production result of the products,
   wherein, in the schedule optimizing step, the production schedule obtained after the time point of the acquisition is optimized based on the production result obtained at the time point of the acquisition of the arrangement means information.

5. The production schedule creating method of claim 1, wherein, in the arrangement means information acquiring step, a worker inputs the arrangement means information.

6. The production schedule creating method of claim 1, wherein the equipment detached arrangement means information includes whether or not the members are arranged on the equipment detached arrangement means.

7. The production schedule creating method of claim 1, wherein the products are mounting boards on which an electronic component is mounted, and
   wherein the production equipment is a component mounter.

8. A production schedule creating apparatus that creates a production schedule for producing a plurality of models of products by production equipment, the apparatus comprising:
   a sequence information acquirer that acquires production sequence information including a production sequence for producing the plurality of models of products and preparation work sequence information including a sequence of arrangement work of arranging members corresponding to the plurality of models on arrangement means which is attached to the production equipment so as to arrange the members that are used for production of the products;
   an arrangement means information acquirer having a processor that acquires updated arrangement means information including production arrangement means information that is information of the arrangement means attached to the production equipment and equipment detached arrangement means information that is information of an equipment detached arrangement means that is not attached to the production equipment;
   a schedule optimizing processor that optimizes a production schedule obtained after a time point of acquisition of the arrangement means information, based on the production sequence information, the preparation work sequence information, and the updated arrangement means information; and
   a work instruction processor that generates and transmits at least one arrangement work instruction based on the optimized production schedule.

9. The production schedule creating apparatus of claim 8, wherein the schedule optimizing processor optimizes the production schedule obtained after the time point of the acquisition in a condition that the production sequence is not changed for a predetermined period from the time point of the acquisition of the arrangement means information.

10. The production schedule creating apparatus of claim 8, wherein the schedule optimizing processor optimizes the production schedule obtained after the time point of the acquisition in a condition that the production sequence is not allowed to be changed for a predetermined period from the time point of the acquisition of the arrangement means information and the production sequence is allowed to be changed after the predetermined period.

11. The production schedule creating apparatus of claim 8, further comprising:
    a production result collector that collects a production result of the products,
    wherein the schedule optimizing processor optimizes the production schedule obtained after the time point of the acquisition, based on the production result obtained at the time point of the acquisition of the arrangement means information.

12. The production schedule creating apparatus of claim 8, wherein the arrangement means information acquirer acquires the arrangement means information input by a worker.

13. The production schedule creating apparatus of claim 8, wherein the equipment detached arrangement means information includes whether or not the members are arranged on the equipment detached arrangement means.

14. The production schedule creating apparatus of claim 8, wherein the products are mounting boards on which an electronic component is mounted, and
    wherein the production equipment is a component mounter.

* * * * *